United States Patent
Crissman et al.

(10) Patent No.: US 6,397,887 B1
(45) Date of Patent: Jun. 4, 2002

(54) VALVE HOUSING WITH INTEGRAL DOWNSTREAM PURGE

(75) Inventors: Paul D. Crissman, Camarillo; Craig Iverson, Simi Valley; Ricardo Martin Cordova, Arleta, all of CA (US)

(73) Assignee: ITT Industries Pure-Flo Solutions Group, Simi Valley, CA (US)

( * ) Notice: Subject to any disclaimer, the term of this patent is extended or adjusted under 35 U.S.C. 154(b) by 0 days.

(21) Appl. No.: 09/803,804

(22) Filed: Mar. 12, 2001

(51) Int. Cl.⁷ .................................................. F16K 7/12
(52) U.S. Cl. ....................................... 137/597; 137/240
(58) Field of Search ................................ 137/240, 597; 251/331

(56) References Cited

U.S. PATENT DOCUMENTS

| | | | |
|---|---|---|---|
| 5,273,075 A | 12/1993 | Skaer | |
| 5,427,150 A | 6/1995 | Skaer et al. | |
| 5,549,134 A * | 8/1996 | Browne et al. | 137/240 |
| 5,657,786 A * | 8/1997 | DuRoss et al. | 137/240 |
| 5,755,155 A * | 5/1998 | Buesing | 137/240 |
| 5,906,223 A | 5/1999 | Pinkham | |
| 6,112,767 A | 9/2000 | Pinkham | |
| 6,250,332 B1 * | 6/2001 | Backlund | 137/597 |

* cited by examiner

Primary Examiner—John Fox
(74) Attorney, Agent, or Firm—Stetina Brunda Garred & Brucker

(57) ABSTRACT

A valve housing is provided with an integrally formed valve housing block and a main flow channel formed through the valve housing block. The valve housing has a distribution valve mounting surface formed upon the valve housing block, and a distribution port formed in the valve housing block. The valve housing has an upstream distribution passage extending from the main flow channel to the distribution valve mounting surface, and a downstream distribution passage extending from the distribution valve mounting surface and to the distribution port. The valve housing has a purge valve mounting surface formed upon the valve housing block, and a purge port formed in the valve housing block. The valve housing has a first purge passage extending from the purge port to the purge valve mounting surface, and a second purge passage extending from the purge valve mounting surface to the downstream distribution passage.

20 Claims, 10 Drawing Sheets

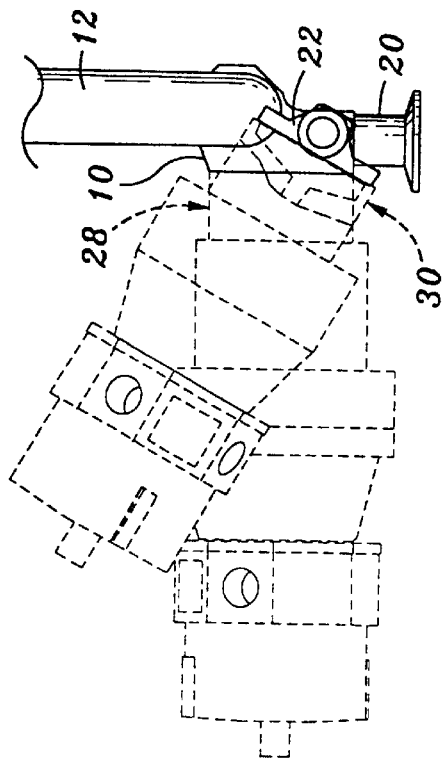
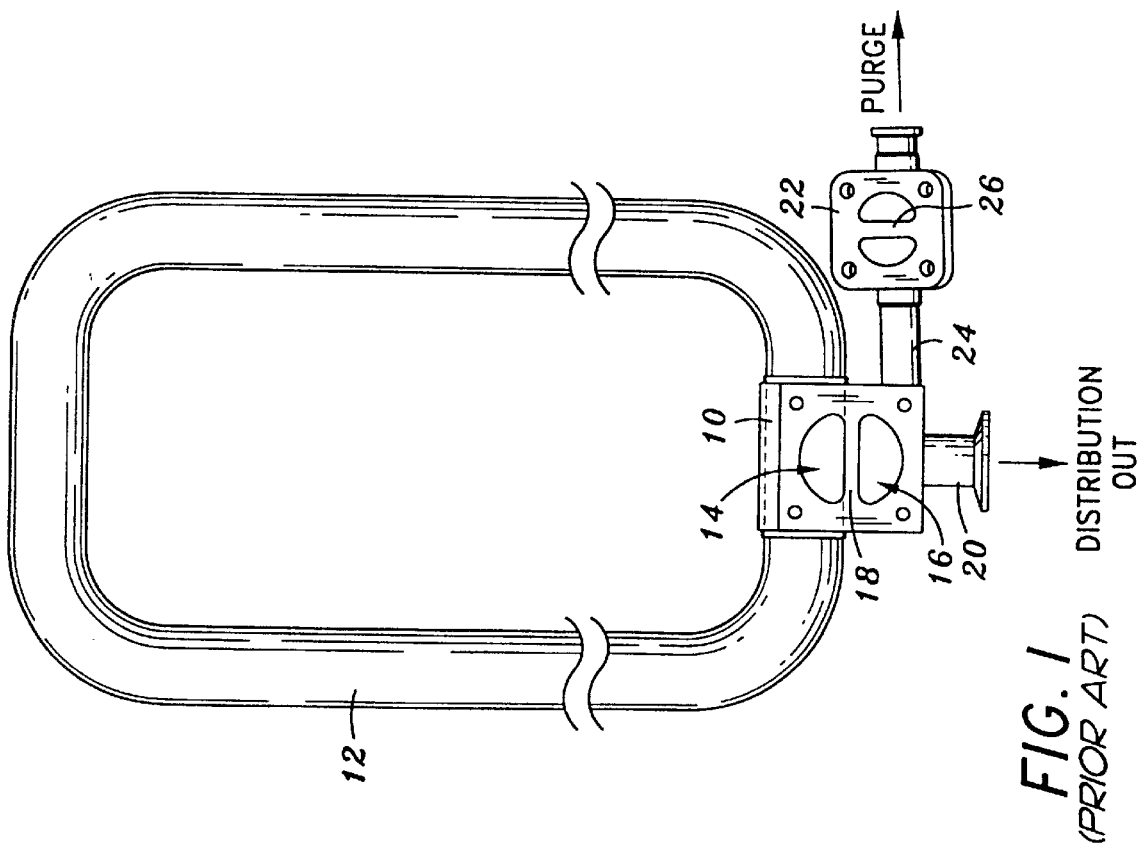
FIG. 2 (PRIOR ART)
FIG. 1 (PRIOR ART)

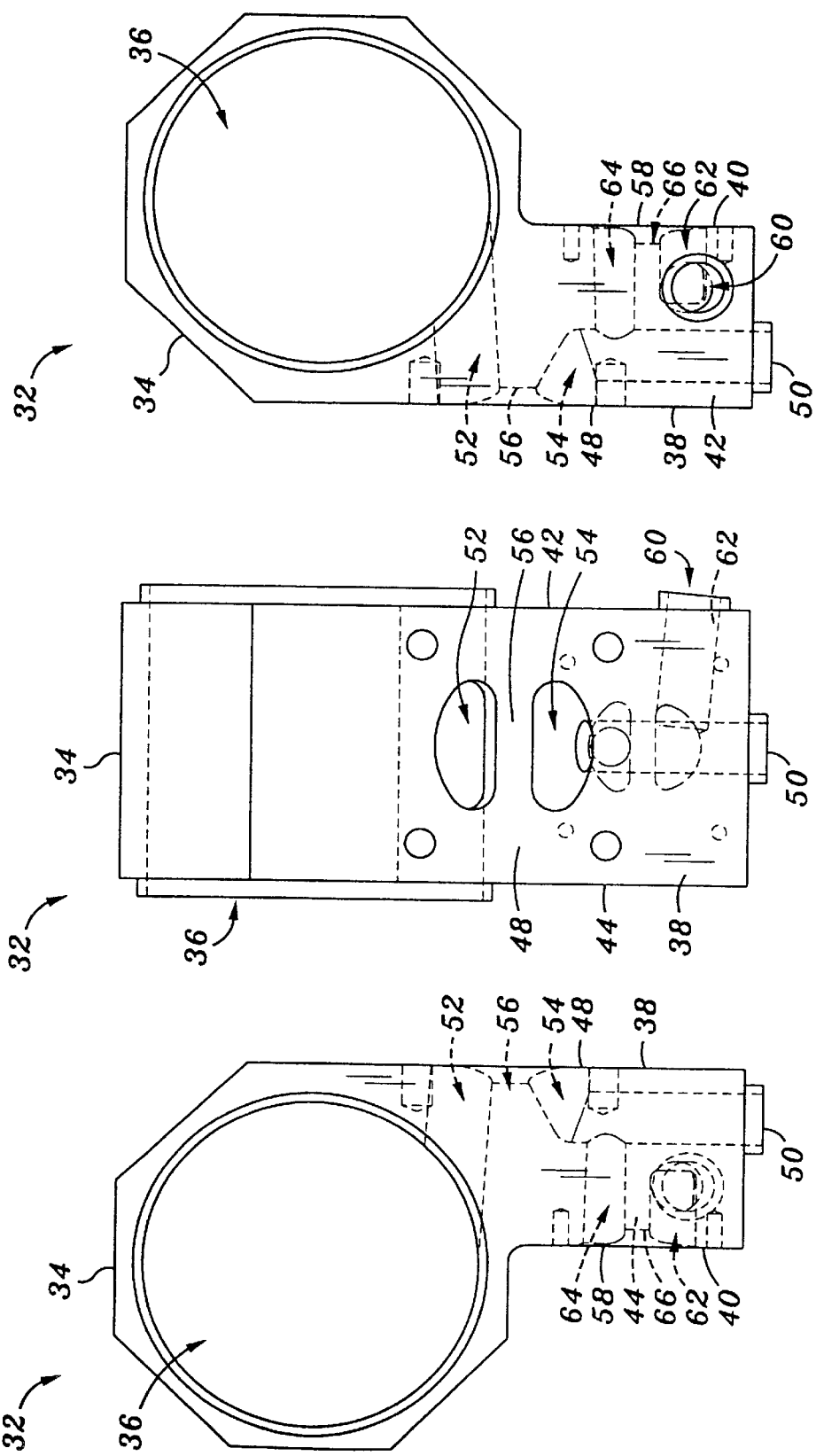

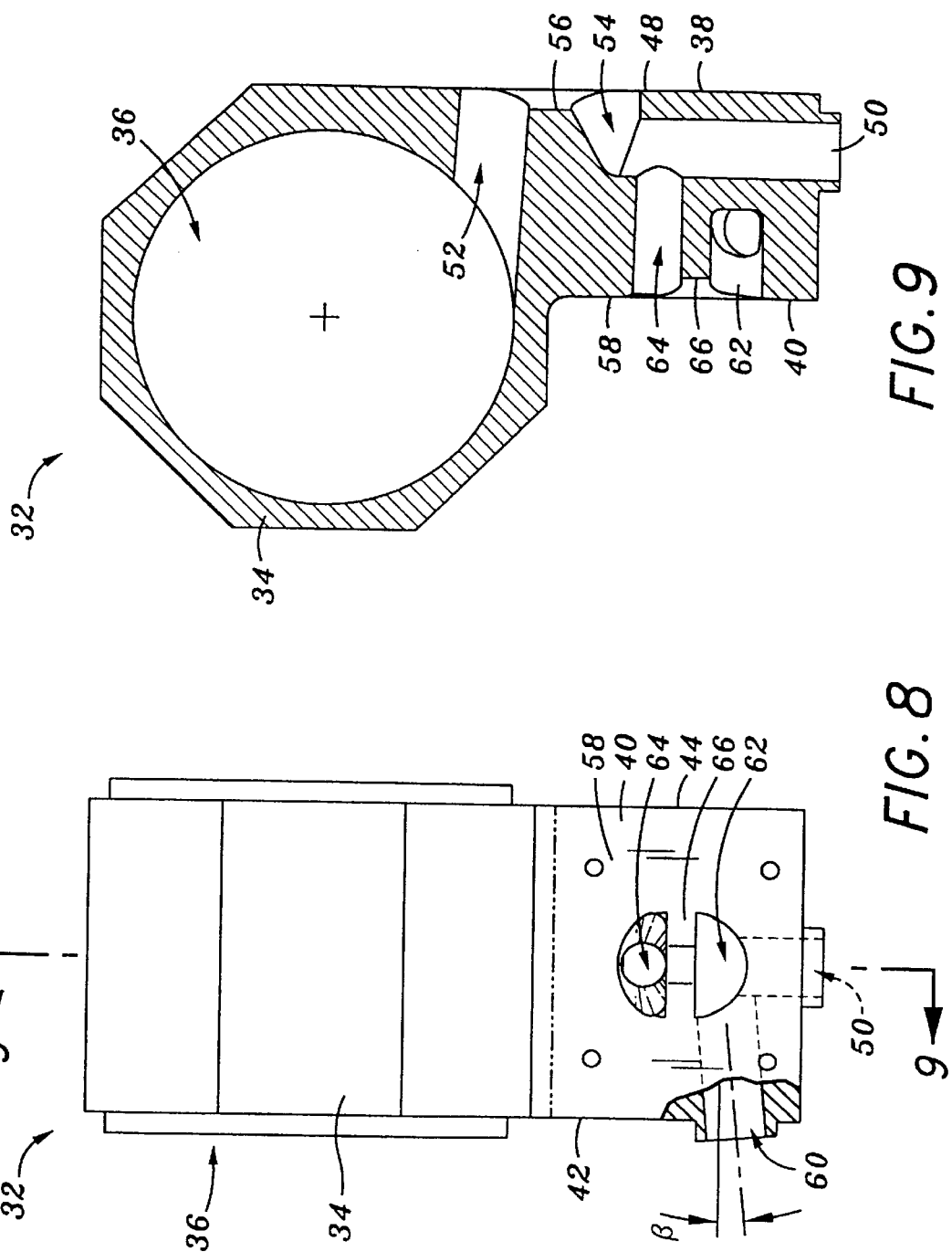

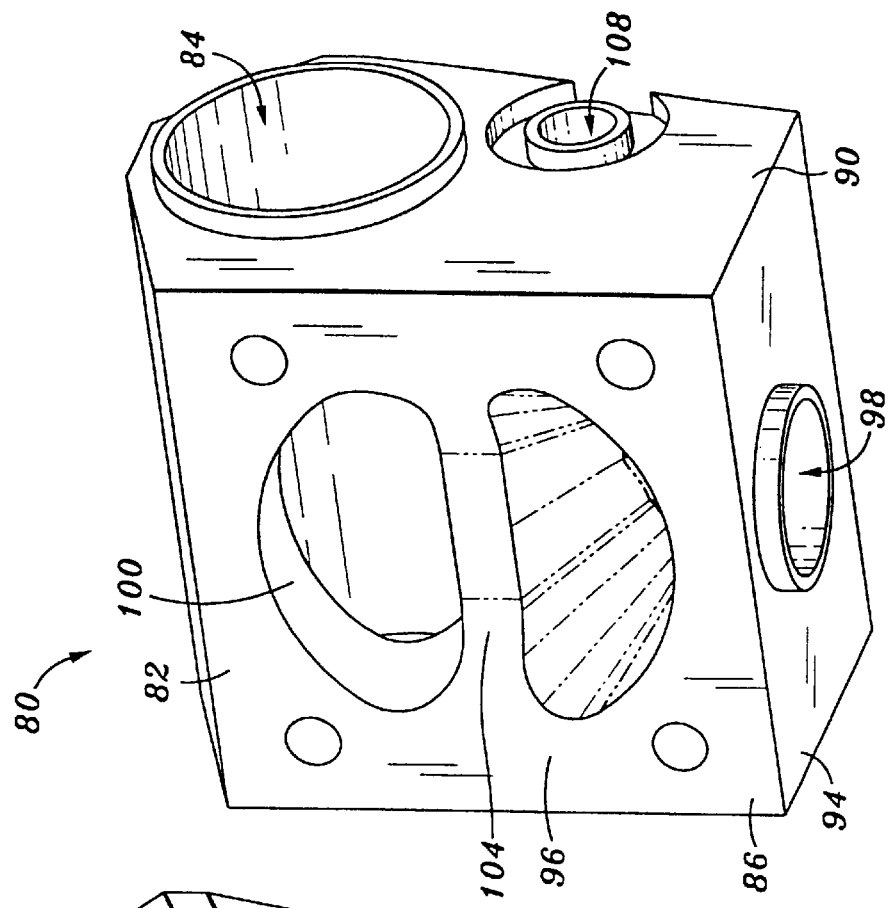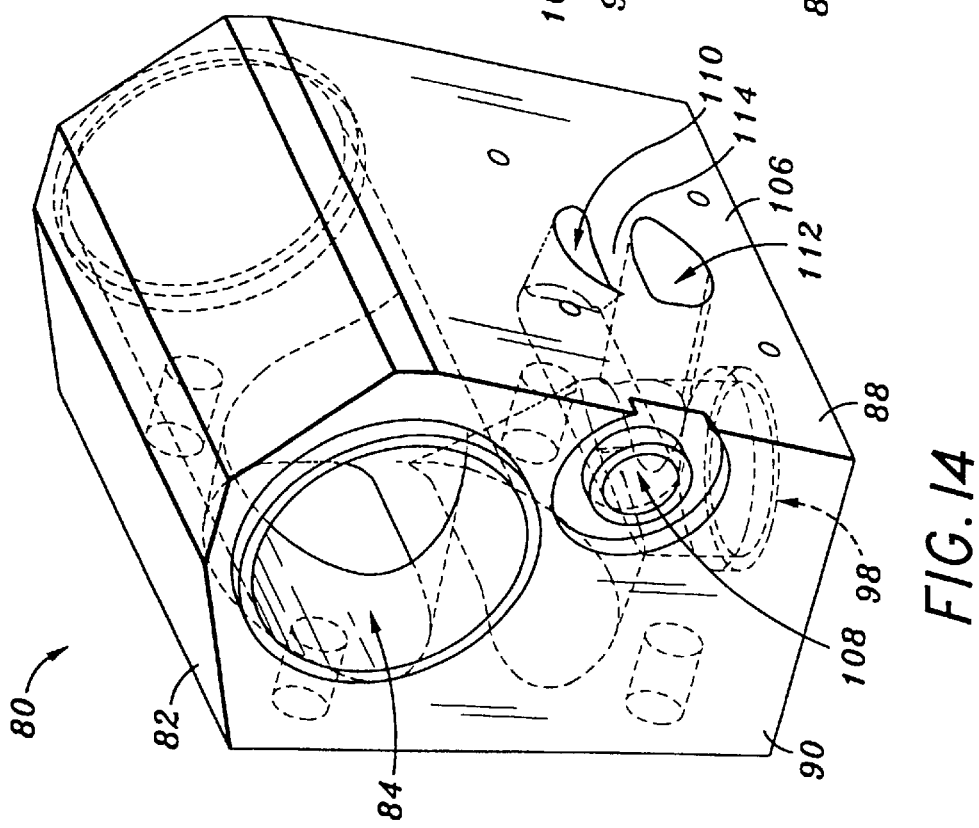

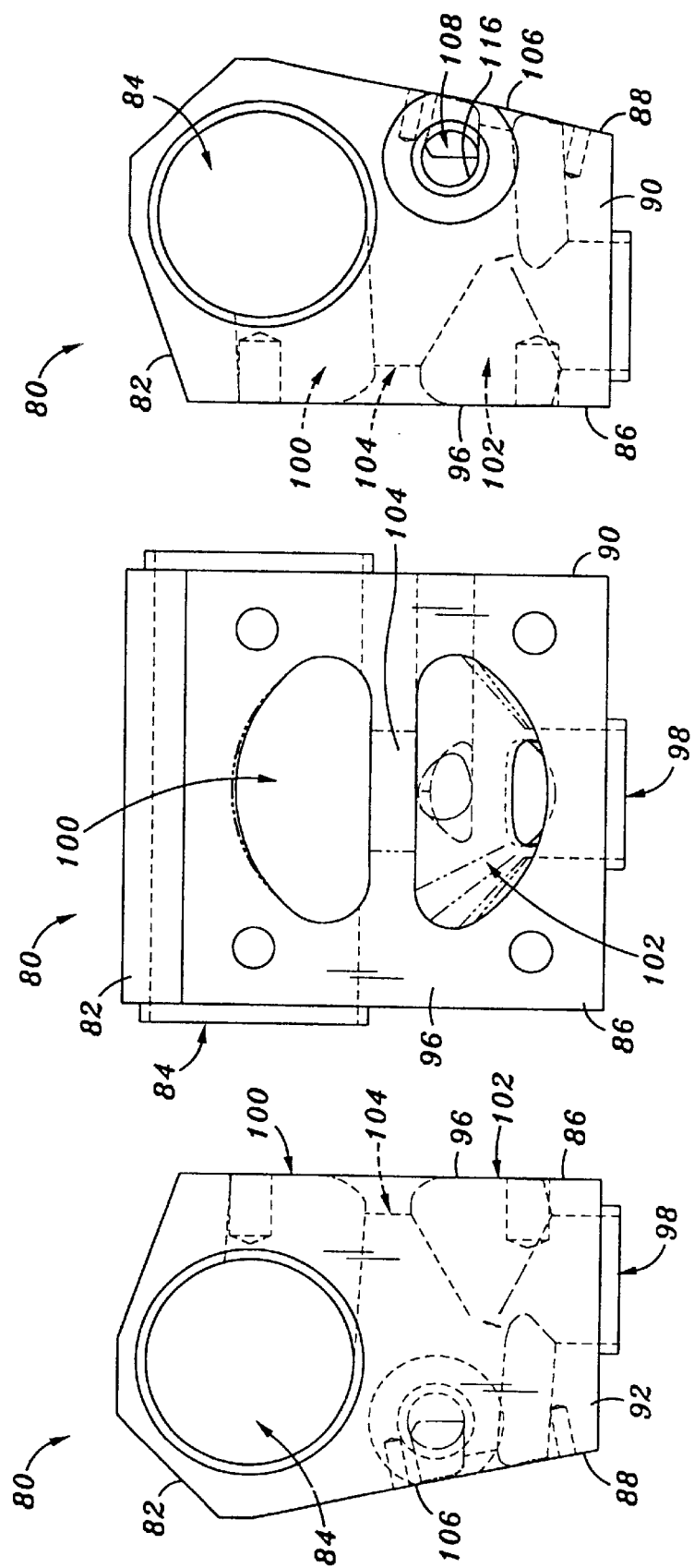

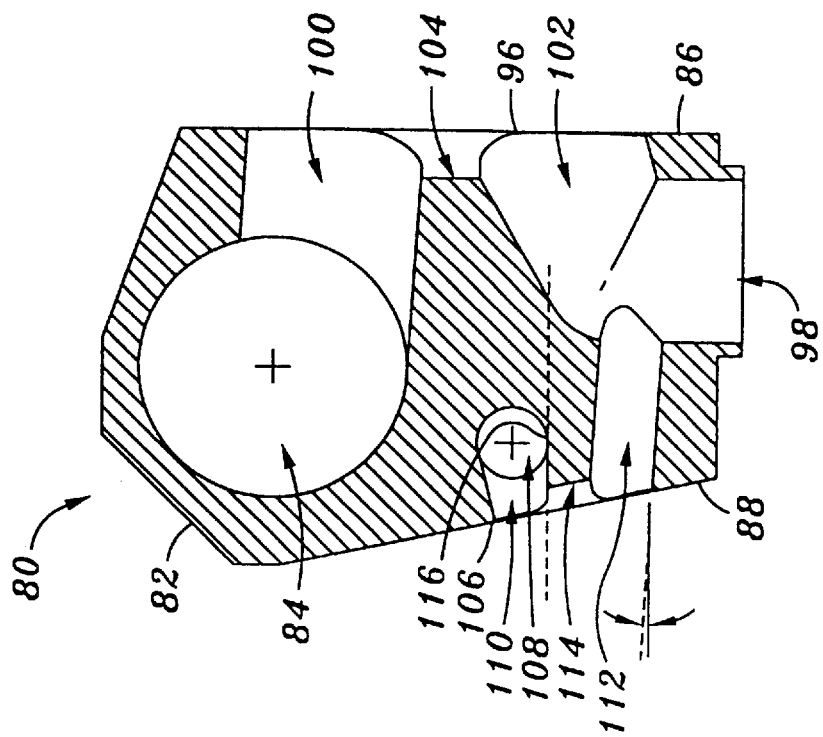
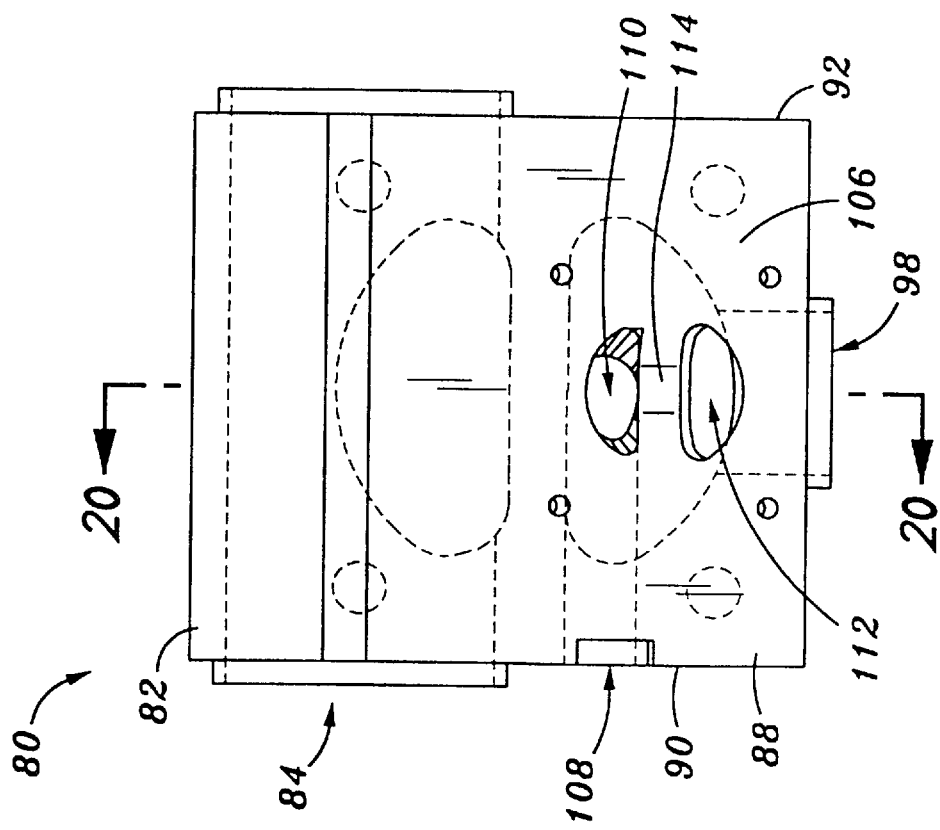
FIG. 20
FIG. 19

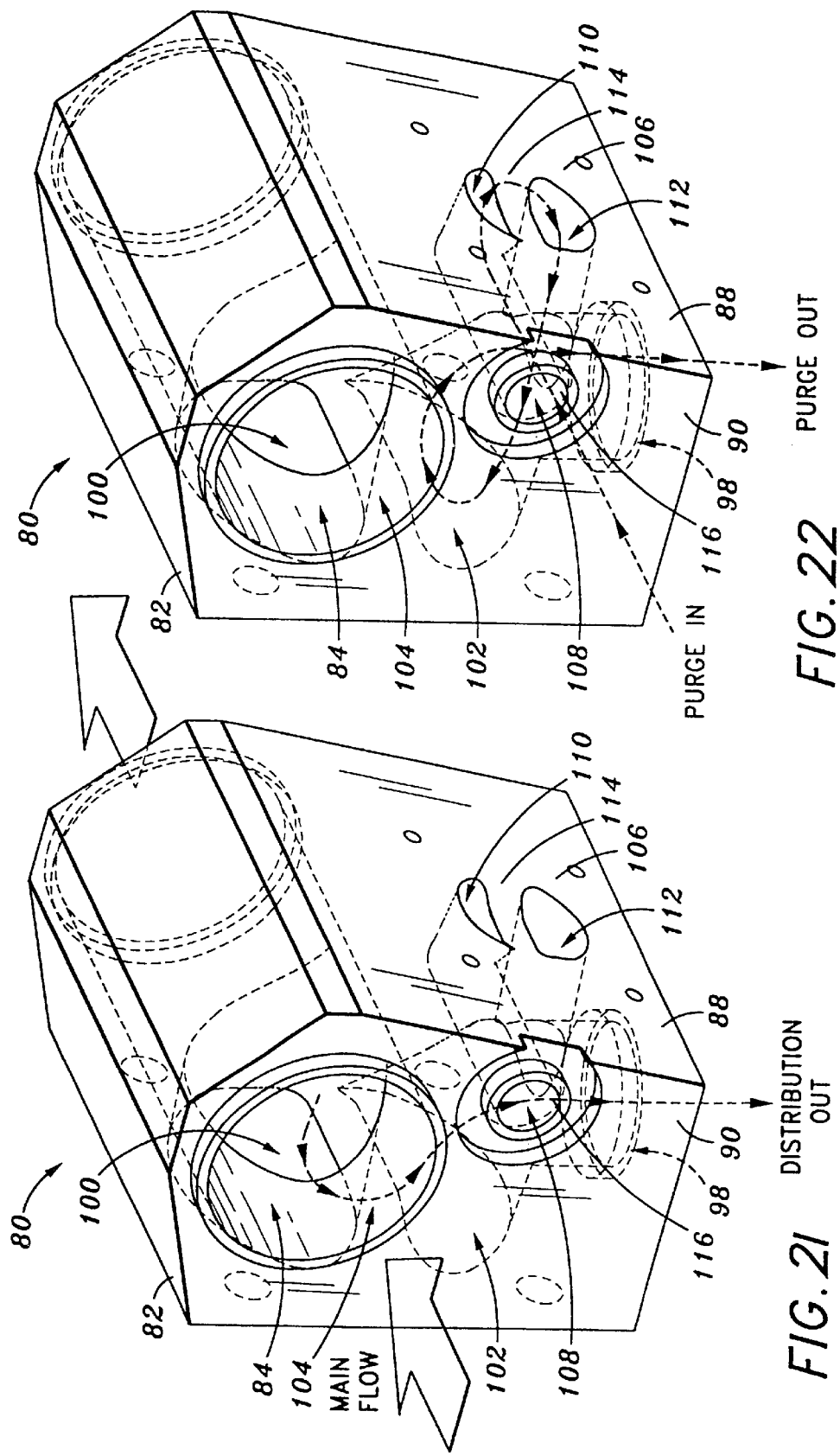

US 6,397,887 B1

VALVE HOUSING WITH INTEGRAL DOWNSTREAM PURGE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to fluid valves, and more particularly to a distribution diaphragm valve as used in cooperation with a downstream purge valve.

A diaphragm type tee-valve includes a valve housing body which has a main flow channel formed through it. In this regard, the main flow channel is intended for unobtrusively forming an in-situ portion of the product distribution loop to which it is attached. The tee-valve may be utilized a point of use or distribution valve for receiving fluid product from the product distribution loop. A valve mounting surface formed upon the valve housing body. An upstream passage is formed to transversely extend from the main flow channel to the valve mounting surface. A downstream passage is formed to extend from the valve mounting surface and terminate at a distribution port. A valve weir separates the upstream and downstream passages adjacent the valve mounting surface. A diaphragm valve housing may be mounted upon the valve mounting surface, with a diaphragm being configured to engage the valve weir. As such, with the diaphragm in an open position, the downstream passage is in fluid communication with the upstream passage. for passage of fluid flow from the upstream distribution passage through the distribution port. Actuation of the diaphragm against the valve weir prevents fluid flow between the upstream and downstream passages thereby closing the valve.

As mentioned above, such tee-valves may be utilized as point of use or distribution valves for receiving fluid product from a product distribution loop. These valves have application in a wide range of fluid handling systems, such as those for pharmaceutical, biotech processing, food and beverage, and cosmetic and consumer products applications. Such applications are typically subject to strict governmental regulations and industry practices and procedures. Of particular concern is the cleanliness and sterility of the downstream passage after usage of the distribution valve. In this regard, a purge or cleaning operation of the downstream passage is desirable while the distribution valve is in the closed position. Pressurized fluid, steam or air is utilized for such purpose. A separate diaphragm type purge valve is used to introduce such pressurized fluid, steam or air to the downstream passage of the distribution valve.

Referring now to FIGS. 1 and 2, there is shown a exemplary prior art distribution valve and purge valve arrangement. FIG. 1 is a prior art distribution valve housing 10 which is connected to a product distribution loop 12. The distribution valve housing 10 is provided with an upstream passage 14, a downstream passage 16 and distribution valve weir 18 which separates the upstream and downstream passages 14, 16. The downstream passage 16 terminates at a distribution port 20.

A purge valve housing 22 is attached to the downstream passage 16 via a tubular fitting 24. The purge valve housing is of a diaphragm type and is provided with a purge valve weir 26. The purge valve housing 16 is used to introduce pressurized fluid, steam or air to the downstream passage 16 through the tubular fitting 24. FIG. 2 is a side view of the prior art distribution valve housing 10 and attached purge valve housing 16 (each with a diaphragm housing 28, 30 shown in phantom). The purge valve housing 22 is formed as separate component from the distribution valve housing 10. In this regard, the tubular fitting 24 must be utilized to accommodate the attachment of the purge valve housing 22 to the distribution valve housing 10. A welding operation is a typical method for attaching the two components.

The problem encountered with such an arrangement, is the inherent existence of a pronounced dead-leg. Dead-legs are areas where fluid may become trapped in a valve system when the flow of fluid in a particular branch of the system is halted. Entrapped fluid is considered a contaminant to the system. In the context of the downstream purge valve arrangement, the distance between the purge valve weir 26 to the center line of the downstream passage 16 is considered a dead-leg. The distance of the dead-leg in relation to the diameter of the dead-leg is a physical relationship which is often specified in regulations and guidelines. For example, a regulation or guideline may specify that any dead-leg must have a distance less than 6 times the diameter (referred to as the 6D rule). As such, minimization of such dead-leg distance to diameter ratio and drainage of the dead-leg is desirable.

Accordingly, there is a need in the art for an improved distribution valve and purge valve arrangement in comparison to the prior art.

BRIEF SUMMARY OF THE INVENTION

In accordance with an embodiment of the present invention, there is provided a valve housing with integral downstream purge. The valve housing is provided with an integrally formed valve housing block. The valve housing is further provided with a main flow channel formed through the valve housing block. The valve housing is further provided with a distribution valve mounting surface formed upon the valve housing block. The valve housing is further provided with a distribution port formed in the valve housing block. The valve housing is further provided with an upstream distribution passage extending from the main flow channel to the distribution valve mounting surface. The valve housing is further provided with a downstream distribution passage extending from the distribution valve mounting surface and to the distribution port. The downstream distribution passage is in fluid communication with the upstream distribution passage for passage of fluid flow from the upstream distribution passage through the distribution port. The valve housing is further provided with a purge valve mounting surface formed upon the valve housing block. The valve housing is further provided with a purge port formed in the valve housing block. The valve housing is further provided with a first purge passage extending from the purge port to the purge valve mounting surface. The valve housing is further provided with a second purge passage extending from the purge valve mounting surface to the downstream distribution passage. The second purge passage is in fluid communication with the first purge passage for passage of fluid flow from the purge port through the first and second purge passages into the downstream distribution passage.

According to an embodiment of the present invention, the second purge passage is positioned relatively above the first purge passage with the second purge passage disposed between the main flow channel and the first purge passage. Further, the first purge passage is formed to decline from the purge valve mounting surface toward the purge port for allowing fluid drainage of the first purge passage towards the purge port.

According to another embodiment of the present invention, the first purge passage is positioned relatively above the second purge passage with the first purge passage disposed between the main flow channel and the second purge passage. In addition, the housing body further comprises a purge valve weir disposed between the first and second purge passages adjacent the purge valve mounting surface. The first purge passage is defined by a first purge passage inner circumference thereof, and the purge valve weir is formed tangentially relative to the first purge passage inner circumference. The first purge passage is horizontally aligned from the purge port to the purge valve weir. Further, the second purge passage is formed to relatively decline from the purge valve mounting surface towards the downstream distribution passage for allowing fluid drainage of lithe second purge passage towards the downstream distribution passage.

In addition, the distribution valve mounting surface and the purge valve mounting surface are disposed upon opposing faces of housing body. In this regard, the valve housing block may have opposing front and back lateral faces disposed longitudinally along the main flow channel. The distribution valve mounting surface is disposed upon the front lateral face, and the purge valve mounting surface is disposed upon the back lateral face. The valve housing block may further have opposing first and second lateral faces disposed transverse with the main flow channel. The purge port is formed in the first lateral face. The valve housing block may have opposing first and second lateral faces disposed transverse with the main flow channel. The purge port is formed in the first lateral face. The valve housing block may further have a bottom face with the distribution port being formed in the bottom face.

As such, based on the foregoing, the present invention mitigates the inefficiencies and limitations associated with prior art arrangements. In particular, the valve housing of the present invention is provided with the integrally formed valve housing block. Such valve housing block is commonly utilized for both the distribution valve and purge valve functions. Unlike prior art configurations which a distribution valve housing must accommodate attachment of a separately formed purge valve housing through a intermediate tubing, the present invention integrates both components into a single structure, the integrally formed valve housing block. As such, the dead-leg between the purge valve weir to the downstream passage is minimized. This is because the design avoid use of any intermediate tubing or piping to interconnect separately formed distribution land purge valve components.

Accordingly, the present invention represents a significant advance in the art.

BRIEF DESCRIPTION OF THE DRAWINGS

These, as well as other features of the present invention, will become more apparent upon reference to the drawings wherein:

FIG. 1 is a prior art distribution valve housing with an attached downstream purge valve housing;

FIG. 2 is a side view of the prior art distribution valve housing with the attached downstream purge valve housing (with diaphragm housing shown in phantom);

FIG. 5 is a side view of the valve housing with integral downstream purge according to the first embodiment oriented with a second lateral face shown (with internal passages shown in phantom);

FIG. 6 is a side view of the valve housing with integral downstream purge according to the first embodiment oriented with the front lateral face shown (with internal passages shown in phantom);

FIG. 7 is a side view of the valve housing with integral downstream purge according to the first embodiment oriented with the first lateral face shown (with internal passages shown in phantom);

FIG. 8 is a side view of the valve housing with integral downstream purge according to the first embodiment oriented with the back lateral face shown (with internal passages shown in phantom);

FIG. 9 is a cross sectional view of the valve housing with integral downstream purge as seen along axis 9—9 of FIG. 8;

FIG. 14 is a raised perspective view of a valve housing with integral downstream purge, oriented with a back lateral face and a first lateral face shown (with internal passages shown in phantom) according to a second embodiment of the present invention;

FIG. 15 is lowered perspective view of the valve housing with integral downstream purge according to the second embodiment oriented with a front lateral face and the first lateral face shown;

FIG. 16 is a side view of the valve housing with integral downstream purge according to the second embodiment oriented with a second lateral face shown (with internal passages shown in phantom);

FIG. 17 is a side view of the valve housing with integral downstream purge according to the second embodiment oriented with the front lateral face shown (with internal passages shown in phantom);

FIG. 18 is a side view of the valve housing with integral downstream purge according to the second embodiment oriented with the first lateral face shown (with internal passages shown in phantom);

FIG. 19 is a side view of the valve housing with integral downstream purge according to the second embodiment oriented with the back lateral face shown (with internal passages shown in phantom);

FIG. 20 is a cross sectional view of the valve housing with integral downstream purge as seen along axis 20—20 of FIG. 19;

FIG. 21 is the valve housing with integral downstream purge of FIG. 14 as shown with a illustrative distribution flow path; and FIG. 22 is the valve housing with integral downstream purge of FIG. 14 as shown with a illustrative purge flow path.

DETAILED DESCRIPTION OF THE INVENTION

Figure 4:
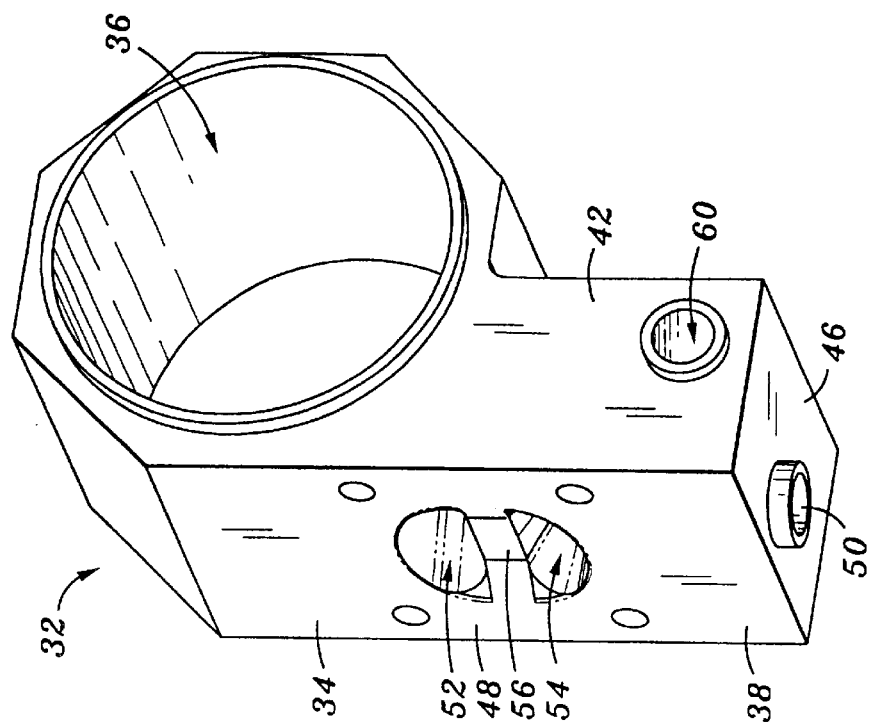
FIG. 4 is lowered perspective view of the valve housing with integral downstream purge according to the first embodiment oriented with a front lateral face and the first lateral face shown.

Referring now to the drawings wherein the showings are for purposes of illustrating a preferred embodiment of the present invention only, and not for purposes of limiting the same, FIGS. 3–22 illustrate preferred embodiments of the valve housing according to aspects of the present invention.

Figure 3:
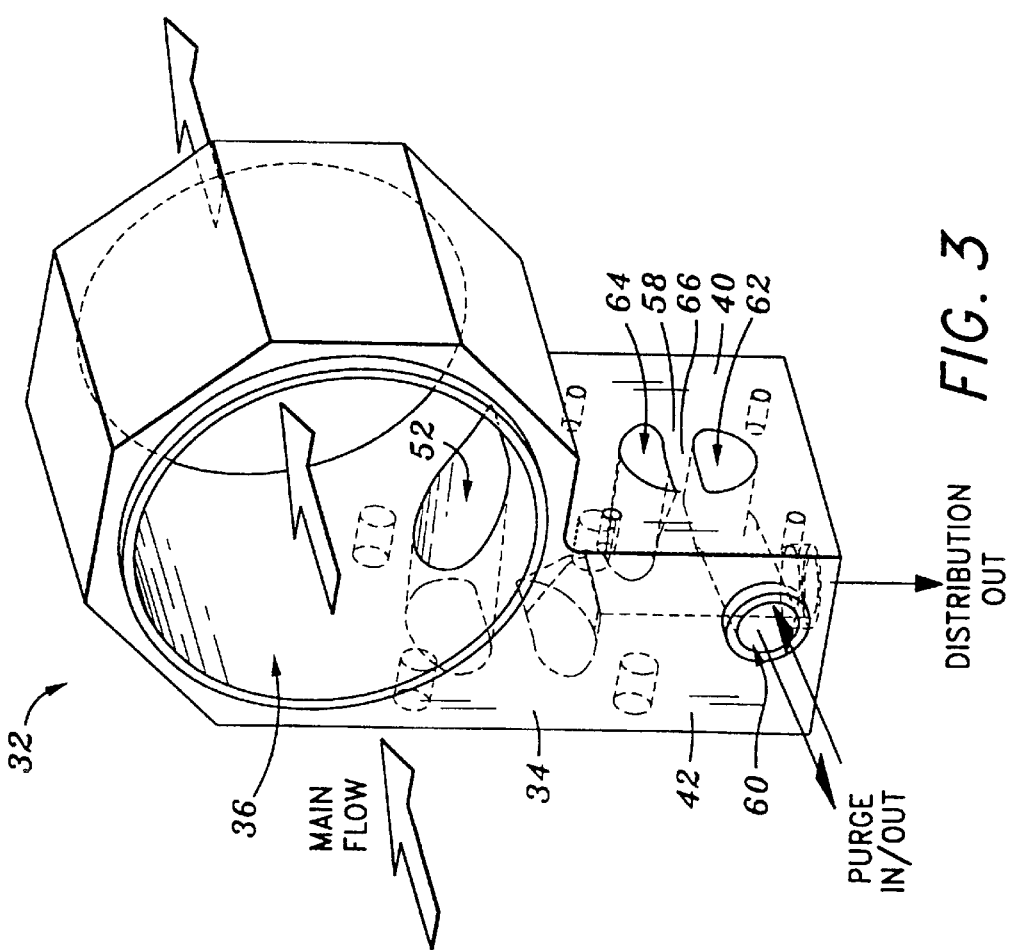
FIG. 3 is a raised perspective view of a valve housing with integral downstream purge, oriented with a back lateral face and a first lateral face shown (with internal passages shown in phantom) according to a first embodiment of the present invention.

Referring now to FIGS. 3 and 4 there is depicted a valve housing with integral downstream purge 32 (with internal passages shown in phantom) according to a first embodiment of the present invention. The valve housing 32 is provided with an integrally formed valve housing block 34. A main flow channel 36 is formed through the valve housing block 34.

The valve housing block 34 may be formed to have opposing front and back lateral faces 38, 40 disposed longitudinally along the main flow channel 36. FIG. 6 is a side view of the valve housing 32 oriented with the front lateral face 38 shown. FIG. 8 is a side view of the valve housing 32 oriented with the back lateral face 40 shown. Further, the valve housing block 34 have opposing first and second lateral faces 42, 44 disposed transverse with the main flow channel 36. FIG. 7 is a side view of the valve housing 32 oriented with the first lateral face 42 shown. FIG. 5 is a side view of the valve housing 32 oriented with the second lateral face 44 shown. The valve housing block may further have a bottom face 46 as can be seen in FIG. 4.

The valve housing 32 is provided with a distribution valve mounting surface 48 formed upon the valve housing block 34. The distribution valve mounting surface 48 may be disposed upon the front lateral face 38. The valve housing 32 is further provided with a distribution port 50 formed in the valve housing block 34. The distribution 50 port may be formed in the bottom face 46. Referring now to FIG. 9, there is depicted is a cross sectional view of the valve housing 32 as seen along axis 9—9 of FIG. 8. The valve housing 32 is further provided with an upstream distribution passage 52 which extends from the main flow channel 36 to the distribution valve mounting surface 48. The valve housing 32 is further provided with a downstream distribution passage 54 which extends from the distribution valve mounting surface 48 and to the distribution port 50. The downstream distribution passage 54 is in fluid communication with the upstream distribution passage 52 for passage of fluid flow from the upstream distribution passage 54 through the distribution port 50. The valve housing 32 may be provided with a distribution valve weir 56 which is separates the upstream and downstream distribution passages 52, 54 adjacent the distribution valve mounting surface 48.

Figure 11:
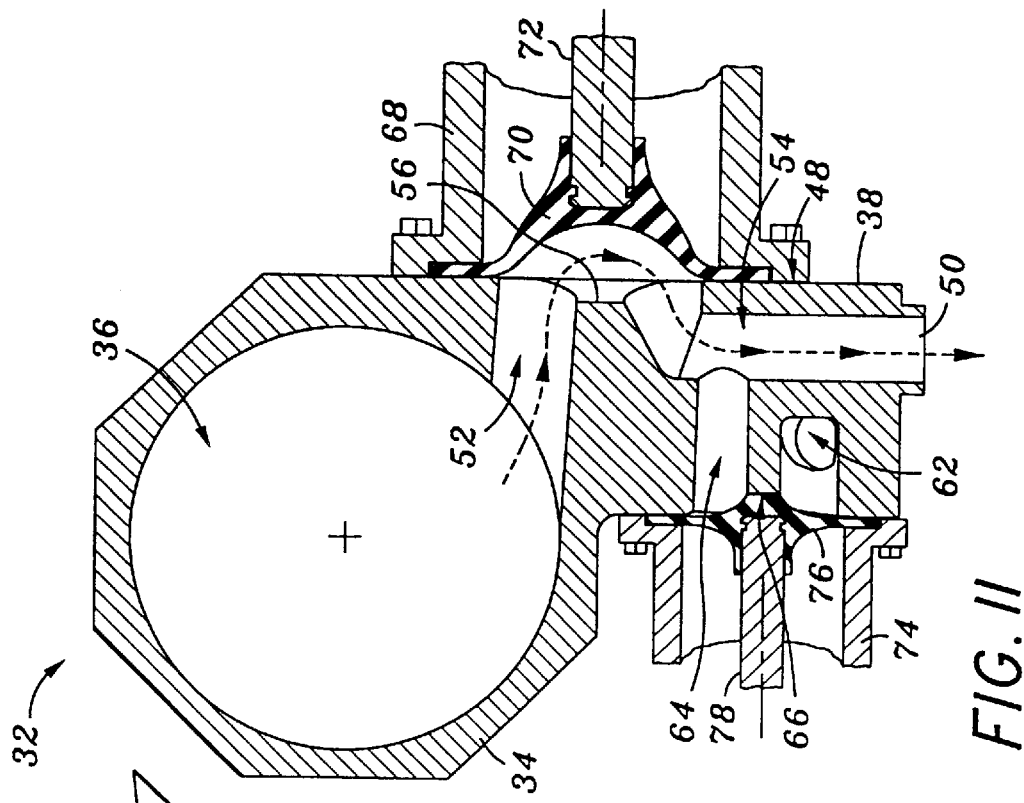
FIG. 11 is a cross sectional view of the valve housing with integral downstream purge as seen along axis 11—11 of FIG. 10 along with distribution and purge valves.
Figure 10:
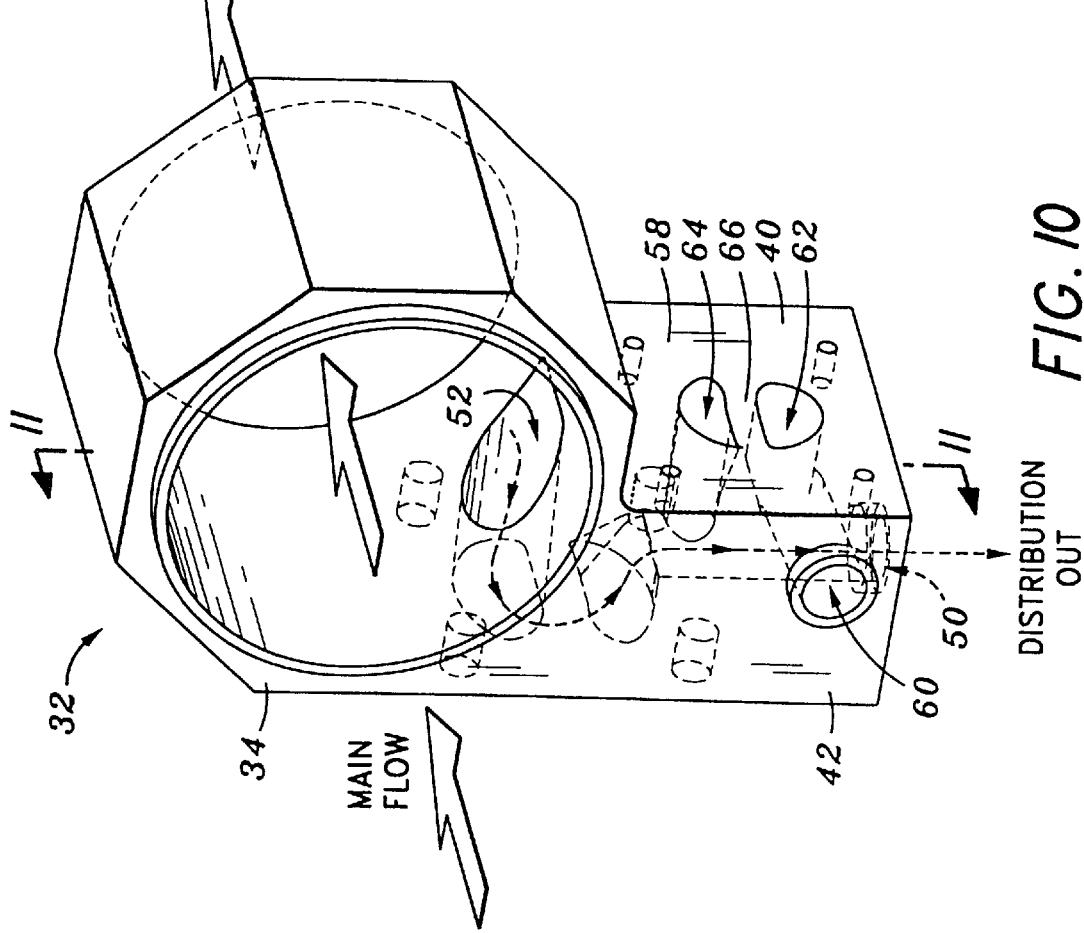
FIG. 10 is the valve housing with integral downstream purge of FIG. 3 as shown with a illustrative distribution flow path.

As such, a distribution conduit or flow path is formed from the main flow channel 36 through the distribution port 50. Referring now to FIGS. 10 and 11, an illustrative distribution flow path is shown in dashed lines. Such distribution conduit begins at the main flow channel 36 and flows into the upstream distribution passage 52, over the Distribution valve weir 56, into the downstream distribution passage 54, and finally through the distribution port 50.

The valve housing 32 is contemplated to be utilized with a distribution diaphragm housing 68. The distribution diaphragm housing 68 is configured to be mounted to the valve housing block 34 at the distribution valve mounting surface 48. The distribution diaphragm housing 68 is provided with a distribution diaphragm 70 and a distribution diaphragm actuator 72. Actuation of distribution diaphragm 70 by the distribution diaphragm actuator 72 regulates flow between the upstream and downstream distribution passages 52, 54. FIG. 11 depicts the distribution diaphragm 70 in an open position, thereby allowing fluid flow between the upstream and downstream distribution passages 52, 54 over the distribution valve weir 56. FIG. 113 depicts the distribution diaphragm 70 in a closed position with the distribution diaphragm 70 actuated against the distribution valve weir 56 thereby preventing fluid flow between the upstream and downstream distribution passages 52, 54.

The valve housing 32 is further provided with a purge valve mounting surface 58 formed upon the valve housing block 34. The purge valve mounting surface 58 may be disposed upon the back lateral face 40. The valve housing 32 is further provided with a purge port 60 formed in the valve housing block 34. The purge port 60 may be formed in the first lateral face 42. Referring now to FIG. 9, there is depicted is a cross sectional view of the valve housing 32 as seen along axis 9—9 of FIG. 8. The valve housing 32 is further provided with a first purge passage 62 which extends from the purge port 60 to the purge valve mounting surface 58. The valve housing 32 is further provided with a second purge passage 64 which extends from the purge valve mounting surface 58 to the downstream distribution passage 54. The second purge passage 64 is in fluid communication with the first purge passage 62 for passage of fluid flow from the purge port 60 through the firsthand second purge passages 62, 64 into the downstream distribution passage 54. In this first embodiment, the second purge passage 64 is positioned relatively above the first purge passage 62 with the second purge passage 64 disposed between the main flow channel 36 and the first purge passage 62. The valve housing 32 may be provided with a purge valve weir 66 which is separates the first and second purge passages 62, 64 adjacent the purge valve mounting surface 58.

Figure 13:
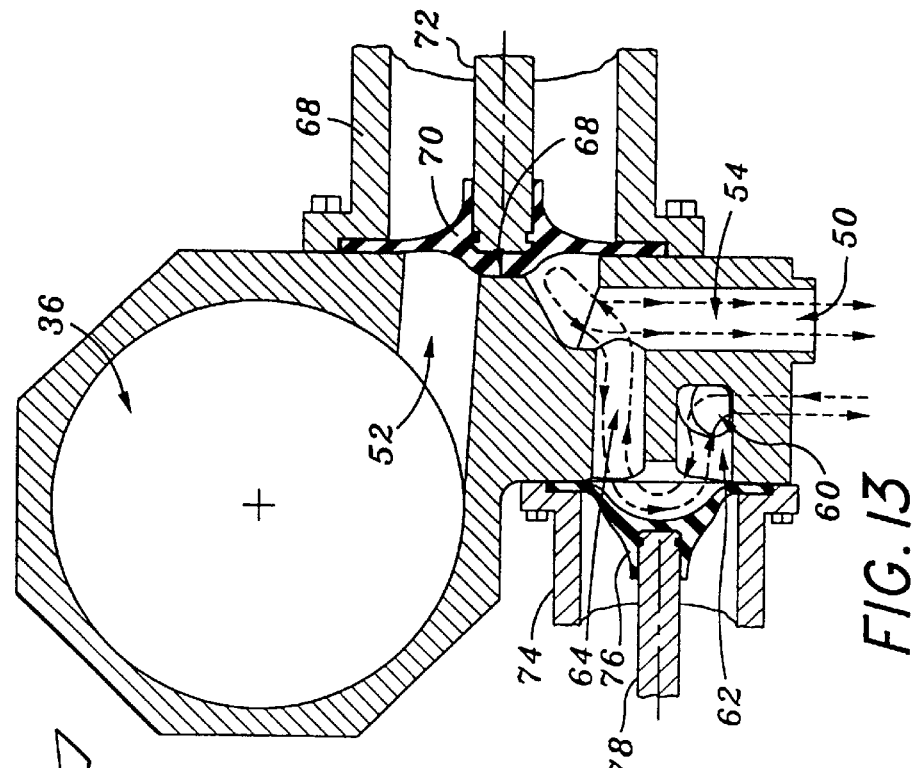
FIG. 13 is a cross sectional view of the valve housing with integral downstream purge as seen along axis 13—13 of FIG. 12 along with distribution and purge diaphragm housing.

The valve housing 32 is contemplated to be utilized with a purge diaphragm housing 74. The purge diaphragm housing 74 is configured to be mounted to the valve housing block 34 at the purge valve mounting surface 58. The purge diaphragm housing 74 is provided with a purge diaphragm 76 and a purge diaphragm actuator 78. Actuation of purge diaphragm 76 by the purge diaphragm actuator 78 regulates flow between the first and second purge passages 62, 64. FIG. 13 depicts the purge diaphragm 77 in an open position, thereby allowing fluid flow between the first and second purge passages 62, 64 over the purge valve weir 66. FIG. 11 depicts the purge diaphragm 76 in a closed position with the purge diaphragm 76 actuated against the purge valve weir 66 thereby preventing fluid flow between the first and second purge passages 62, 64.

Figure 12:
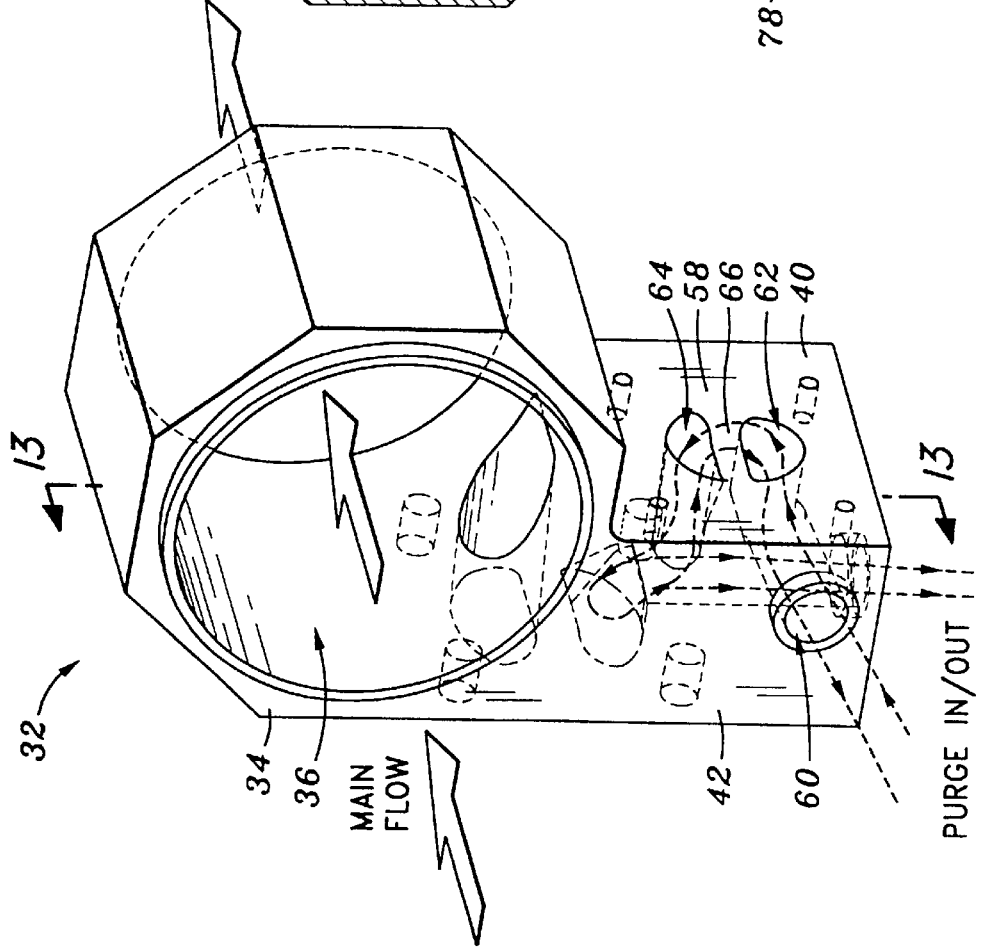
FIG. 12 is the valve housing with integral downstream purge of FIG. 3 as shown with a illustrative purge flow path.

A purge conduit or flow path is formed for purging the downstream distribution passage 54. Referring now to FIGS. 12 and 13, an illustrative purge flow path is shown in dashed lines for such first embodiment of the present invention. The purge conduit begins at the purge port 60 wherein pressurized purging medium, such as a fluid, steam or gas, is introduced. The purge conduit continues into the first purge passage 62, upward over the purge valve weir 66, into the second purge passage 64, and into the downstream distribution passage 54. With the distribution diaphragm 70 in a closed position, the introduced purge medium is contemplated to flush the inner surfaces of the downstream distribution passage 54 including those upward surfaces adjacent the distribution valve weir 56 and distribution diaphragm 70. The purge medium is allowed to drain downward through the downstream distribution passage 54 and out the distribution port 50. In addition, in this first embodiment, the purge medium is also allowed to flow from the second purge passage 64, over the purge valve weir 66, back into the first purge passage 62 and out the purge port 60.

Preferably, the second purge passage 64 is horizontally align ed from the purge valve weir 66 to the downstream distribution passage 54 as shown. In this regard, as mentioned above fluid in the second purge passage 64 may drain either towards the downstream distribution passage 54 or over the purge valve weir 66. Alternatively, the second purge passage 64 may be declined from the purge valve weir 66 towards the downstream distribution passage 54 so as to facilitate fluid drainage into the downstream distribution passage 54 when the purge diaphragm 76 is in the closed position. In addition, the first purge passage 62 is preferably formed to relatively decline from the purge valve mounting surface 58 towards the purge port 60 for allowing fluid drainage of the first purge passage 62 towards the purge port 60.

Referring now to FIGS. 14 and 15 there is depicted a valve housing with integral downstream purge 80 (with internal passages shown in phantom) according to a second embodiment of the present invention. The valve housing 80 is provided with an integrally formed valve housing block 82. A main flow channel 84 is formed through the valve housing is block 82.

The valve housing block 82 may be formed to have opposing front and back lateral faces 86, 88 disposed longitudinally along the main flow channel 84. The front and back lateral faces 86, 88 are not required to be parallel to each other and in this embodiment are disposed with a relative angular orientation. In this embodiment, the front and back lateral faces 86, 88 extend further about the main flow channel 84, in comparison to the front and back lateral faces 38, 40 of the first embodiment. FIG. 17 is a side view of the valve housing 80 oriented with the front lateral face 86 shown. FIG. 19 is a side view of the valve housing 80 oriented with the back lateral face 88 shown. Further, the valve housing block 82 have opposing first and second lateral faces 90, 92 disposed transverse with the main flow channel 84. It is contemplated that the first and second lateral faces 90, 92 are not required to be parallel to each other and may be angularly disposed in relation to each other. FIG. 18 is a side view of the valve housing 80 oriented with the first lateral face 90 shown. FIG. 16 is a side view of the valve housing 80 oriented with the second lateral face 92 shown. The valve housing block may further have a bottom face 94 as can be seen in FIG. 15.

The valve housing 80 is provided with a distribution valve mounting surface 96 formed upon the valve housing block. 82 The distribution valve mounting surface 96 may be disposed upon the front lateral face 86. The valve housing 80 is further provided with a distribution port 98 formed in the valve housing block 82. The distribution 98 port may be formed in the bottom face 94. Referring now to FIG. 20, there is depicted is a cross sectional view of the valve housing 80 as seen along axis 20—20 of FIG. 19. The valve housing 80 is further provided with an upstream distribution passage 100 which extends from the main flow channel 84 to the distribution valve mounting surface 96. The valve housing 80 is further provided with a downstream distribution passage 102 which extends from the distribution valve mounting surface 96 and to the distribution port 98. The downstream distribution passage 102 is in fluid communication with the upstream distribution passage 100 for passage of fluid flow from the upstream distribution passage 102 through the distribution port 98. The valve housing 80 may be provided with a distribution valve weir 104 which is separates the upstream and downstream distribution passages 100, 102 adjacent the distribution valve mounting surface 96.

As such, a distribution conduit or flow path is formed from the main flow channel 84 through the distribution port 98. Referring now to FIG. 21, an illustrative distribution flow path is shown in dashed lines. Such distribution conduit begins at the main flow channel 84 and flows into the upstream distribution passage 100, over the distribution valve weir 104, into the downstream distribution passage 102, and finally through the distribution port 98.

The valve housing 80 is further provided with a purge valve mounting surface 106 formed upon the valve housing block 82. The purge valve mounting surface 106 may be disposed upon the back lateral face 88. It is contemplated that the purge valve mounting surface 106 may be disposed upon other faces of the housing block 82, such as the first or second lateral faces 90, 92. The valve housing 80 is further provided with a purge port 108 formed in the valve housing block 82. The purge port 108 may be formed in the first lateral face 90. The valve housing 80 is further provided with a first purge passage 110 which extends from the purge port 108 to the purge valve mounting surface 106. The valve housing 80 is further provided with a second purge passage 112 which extends from the purge valve mounting surface 106 to the downstream distribution passage 102. The second purge passage 112 is in fluid communication with the first purge passage 110 for passage of fluid flow from the purge port 108 through the first and second purge passages 110, 112 into the downstream distribution passage 102.

In this second embodiment, the first purge passage 110 is positioned relatively above the second purge passage 112 with the first purge passage 110 disposed between the main flow channel 84 and the second purge passage 112. The valve housing 80 may be provided with a purge valve weir 114 which is separates the first and second purge passages 110, 112 adjacent the purge valve mounting surface 106.

A purge conduit or flow path is formed for purging the downstream distribution passage 102. Referring now to FIG. 22, an illustrative purge flow path is shown in dashed lines for such second embodiment of the present invention. The purge conduit begins at the purge port 108 wherein pressurized purging medium, such as a fluid, steam or gas, is introduced. The purge conduit continues into the first purge passage 110, downward over the purge valve weir 114, into the second purge passage 112, and into the downstream distribution passage 102. The introduced purge medium is contemplated to flush the inner surfaces of the downstream distribution passage 102 including those upward surfaces adjacent the distribution valve weir 104 and distribution diaphragm. The purge medium is allowed to drain downward through the downstream distribution passage 102 and out the distribution port 98. Preferably, the first purge passage 110 is horizontally aligned from the purge port 108 to the purge valve weir as shown. The first purge passage 110 may be defined by a first purge passage inner circumference 116 thereof. The purge valve weir 114 may be formed tangentially relative to the first purge passage inner circumference 116. In this regard, as mentioned above fluid in the first purge passage 110 may drain either towards the purge port 108 or over the purge valve weir 114. Alternatively, the first purge passage 110 may be declined from the purge valve weir 114 back towards the purge port 108 so as to facilitate fluid drainage into the downstream distribution passage 102 when the purge diaphragm is in the closed position. In addition, the second purge passage 112 is preferably formed to relatively decline from the purge valve mounting surface 106 towards the downstream distribution passage 102 for allowing fluid drainage of the second purge passage 112 towards the downstream distribution passage 102.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A valve housing with integral downstream purge comprising:
    an integrally formed valve housing block;
    a main flow channel formed through the valve housing block;
    a distribution valve mounting surface formed upon the valve housing block;
    a distribution port formed in the valve housing block;
    an upstream distribution passage extending from the main flow channel to the distribution valve mounting surface;
    a downstream distribution passage extending from the distribution valve mounting surface and to the distribution port, the downstream distribution passage being in fluid communication with the upstream distribution passage for passage of fluid flow from the upstream distribution passage through the distribution port;
    a purge valve mounting surface formed upon the valve housing block;
    a purge port formed in the valve housing block;
    a first purge passage extending from the purge port to the purge valve mounting surface; and
    a second purge passage extending from the purge valve mounting surface to the downstream distribution passage, the second purge passage being in fluid communication with the first purge passage for passage of fluid flow from the purge port through the first and second purge passages into the downstream distribution passage.

2. The valve housing of claim 1 wherein the second purge passage is positioned relatively above the first purge passage with the second purge passage disposed between the main flow channel and the first purge passage.

3. The valve housing of claim 2 wherein the first purge passage is formed to relatively decline from the purge valve mounting surface towards the purge port for allowing fluid drainage of the first purge passage towards the purge port.

4. The valve housing of claim 1 wherein the first purge passage is positioned relatively above the second purge passage with the first purge passage disposed between the main flow channel and the second purge passage.

5. The valve housing of claim 4 wherein the housing body further comprises a purge valve weir disposed between the first and second purge passages adjacent the purge valve mounting surface, the first purge passage is defined by a first purge passage inner circumference thereof, the purge valve weir is formed tangentially relative to the first purge passage inner circumference.

6. The valve housing of claim 4 wherein the housing body further comprises a purge valve weir disposed between the first and second purge passages adjacent the purge valve mounting surface, the first purge passage is horizontally aligned from the purge port to the purge valve weir.

7. The valve housing of claim 4 wherein the second purge passage is formed to relatively decline from the purge valve mounting surface towards the downstream distribution passage for allowing fluid drainage of the second purge passage towards the downstream distribution passage.

8. The valve housing of claim 1 wherein the distribution valve mounting surface and the purge valve mounting surface are disposed upon opposing faces of housing body.

9. The valve housing of claim 1 wherein the valve housing block has opposing front and back lateral faces disposed longitudinally along the main flow channel, the distribution valve mounting surface is disposed upon the front lateral face, the purge valve mounting surface is disposed upon the back lateral face.

10. The valve housing of claim 9 wherein the valve housing block has opposing first and second lateral faces disposed transverse with the main flow channel.

11. The valve housing of claim 10 wherein the purge port is formed in the first lateral face.

12. The valve housing of claim 1 wherein the valve housing block has opposing first and second lateral faces disposed transverse with the main flow channel.

13. The valve housing of claim 12 wherein the purge port is formed in the first lateral face.

14. The valve housing of claim 1 wherein the valve housing block has a bottom face, the distribution port is formed in the bottom face.

15. A valve housing with integral downstream purge comprising:
    an integrally formed valve housing block;
    a main flow channel formed through the valve housing block;
    a distribution valve mounting surface formed upon the valve housing block;
    a distribution port formed in the valve housing block;
    an upstream distribution passage extending from the main flow channel to the distribution valve mounting surface;
    a downstream distribution passage extending from the distribution valve mounting surface and to the distribution port, the downstream distribution passage being in fluid communication with the upstream distribution passage for passage of fluid flow from the upstream distribution passage through the distribution port;
    a purge valve mounting surface formed upon the valve housing block;
    a purge port formed in the valve housing block;
    a first purge passage extending from the purge port to the purge valve mounting surface; and
    a second purge passage extending from the purge valve mounting surface to the downstream distribution passage, the second purge passage being in fluid communication with the first purge passage for passage of fluid flow from the purge port through the first and second purge passages into the downstream distribution passage, the second purge passage is positioned relatively above the first purge passage with the second purge passage disposed between the main flow channel and the first purge passage.

16. The valve housing of claim 15 wherein the first purge passage is formed to relatively decline from the purge valve mounting surface towards the purge port for allowing fluid drainage of the first purge passage towards the purge port.

17. A valve housing with integral downstream purge comprising:
- an integrally formed valve housing block;
- a main flow channel formed through the valve housing block;
- a distribution valve mounting surface formed upon the valve housing block;
- a distribution port formed in the valve housing block;
- an upstream distribution passage extending from the main flow channel to the distribution valve mounting surface;
- a downstream distribution passage extending from the distribution valve mounting surface and to the distribution port, the downstream distribution passage being in fluid communication with the upstream distribution passage for passage of fluid flow from the upstream distribution passage through the distribution port;
- a purge valve mounting surface formed upon the valve housing block;
- a purge part formed in the valve housing block;
- a first purge passage extending from the purge port to the purge valve mounting surface; and
- a second purge passage extending from the purge valve mounting surface to the downstream distribution passage, the second purge passage being in fluid communication with the first purge passage for passage of fluid flow from the purge port through the first and second purge passages into the downstream distribution passage, the second purge passage is positioned relatively below the second purge passage with the first purge passage disposed between the main flow channel and the second purge passage.

18. The valve housing of claim 17 wherein the housing body further comprises a purge valve weir disposed between the first and second purge passages adjacent the purge valve mounting surface, the first purge passage is defined by a first purge passage inner circumference thereof, the purge valve weir is formed tangentially relative to the first purge passage inner circumference.

19. The valve housing of claim 17 wherein the housing body further comprises a purge valve weir disposed between the first and second purge passages adjacent the purge valve mounting surface, the first purge passage is horizontally aligned from the purge port to the purge valve weir.

20. The valve housing of claim 17 wherein the second purge passage is formed to relatively decline from the purge valve mounting surface towards the downstream distribution passage for allowing fluid drainage of the second purge passage towards the downstream distribution passage.

* * * * *